Figure 1:
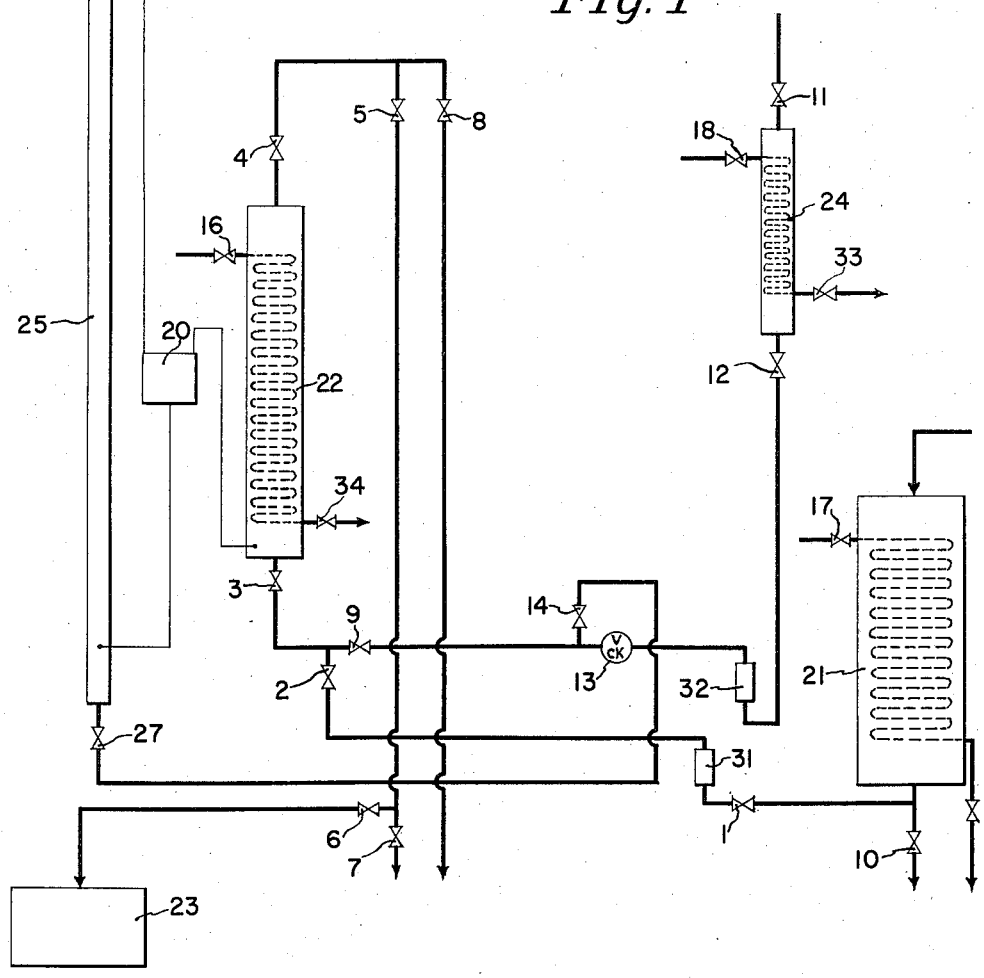

Nov. 18, 1958 W. C. MOSER 2,861,039
CHEMICAL PROCESS
Filed March 9, 1955

INVENTOR
WILLIAM C. MOSER

BY *Herbert M. Wolfson*

ATTORNEY

United States Patent Office 2,861,039
Patented Nov. 18, 1958

2,861,039

CHEMICAL PROCESS

William Charles Moser, Chesterfield County, Va., assignor to E. I. du Pont de Nemours and Company, Wilmington, Del., a corporation of Delaware Application March 9, 1955, Serial No. 493,227

3 Claims. (Cl. 210—32)

This invention relates to the viscose process for preparing regenerated cellulose films, filaments and the like. More particularly, it relates to removing and destroying the organic substances from the alkali liquor used for steeping cellulose.

The steeping step in the viscose process consists of adding aqueous alkali to cellulose to form "alkali cellulose." The resulting material is pressed to about three times the weight of the cellulose charged. The excess alkali solution, containing about 80–90% of the original alkali concentration, must then be purified for re-use.

Heretofore, dialysis or electrolysis was used to purify the alkali solution. Dialysis was preferred. The alkali solution, containing 2% by weight of the organic contaminants leached from the cellulose, was fed to a dialyzer. The organic contaminants, primarily low molecular weight carbohydrates, are denoted by the term "hemicellulose." On one side of the dialysis membrane, a solution rich in alkali was formed; on the other side, a solution rich in hemicellulose. The concentration of the alkali solution was measured, adjusted, and the solution was re-used. The hemicellulose solution was dumped into the river, stream or other natural waters.

Dumping, although disposing of the hemicellulose satisfactorily, provided a new problem. Hemicellulose tends to lower dissolved oxygen in the water. Since aquatic life requires dissolved oxygen to exist, the dumping of hemicellulose tends to destroy aquatic life and cause pollution. To avoid pollution, manufacturers have now resorted to burning the hemicellulose in air. Thus, the procedure for removing and destroying hemicellulose from the waste alkali liquor is lengthy, expensive and requires numerous pieces of equipment. After dialysis, the hemicellulose solution must be transported to evaporators; the hemicellulose must be isolated and then transported to an open pit to be burned.

The object of the present invention is an economical process for removing and destroying hemicellulose from the waste alkali. A further object is a process wherein all the important steps are conducted in a single chamber. Other objects will appear hereinafter.

The objects of this invention are accomplished, in general, by bringing the waste alkali liquor containing the organic contaminants leached from cellulosic material into contact with a bed of activated carbon; contacting the activated carbon with water to remove alkali solution; drying the activated carbon containing the organic contaminants; contacting the impurity-laden activated carbon bed with a steam-air mixture while regulating the admission of air to maintain the temperature of the bed below 250° C.; increasing the percentage of the air as combustion progresses; and then contacting the bed with pure heated air while regulating the admission of air to maintain the temperature of the bed below 250° C. to complete combustion of the organic contaminants and to reactivate the carbon.

Figure 1 is a schematic diagram of the apparatus used in the process.

In a specific embodiment the waste caustic alkali, containing organic impurities, at a temperature of 40°–50° C. is passed through a bed of activated carbon at a rate of about 0.13 gallon per minute per square foot of bed for 8 hours. The carbon absorbs the organic impurities from the caustic alkali solution. The carbon laden with the impurities is washed with water at 90° C. to remove most of the caustic adhering to the carbon and then dried by exposure to warm air. The air at a temperature of 100°–150° C. is passed through the bed at a rate of 100–125 cubic feet per minute for 5–6 hours. A steam-air mixture of approximately 98.8 mol percent steam and 1.2 mol percent of air is then passed through the bed at a rate of 100 pounds per hour of steam for 8–12 hours. The admission of air is controlled to maintain the temperature of the bed between 200 and 230° C. Toward the conclusion of this step the percentage of air is increased as necessary to maintain the appropriate temperature range. Final combustion occurs by flowing air at 200°–230° C. through the bed for 6–8 hours at a rate of 50–75 cubic feet per minute. By this process substantially all of the alkali is recovered; the hemicellulose is destroyed; and the reactivated carbon displays approximately 90% of its original adsorptive power.

*Example*

Referring now to Figure 1 for this example, sixty pounds of activated carbon are packed into chamber 22 to a depth of four feet, equivalent to ⅘ the height of the column. The chamber also contains a helical pipe coil through which steam can be passed to heat the carbon bed. Steam at a pressure of 30 p. s. i. g. can be admitted through valve 16. The inlet at the bottom of chamber 22 is connected to both the waste caustic supply at 21 and the air supply at 26. Valves 14, 9 and 2 are arranged to admit either heated air or waste caustic.

Waste caustic tank 21 receives caustic which has been used in the steeping operation. The caustic contains an appreciable quantity of hemicellulose which destroys the usefulness of the caustic for further steeping operations. The usual concentration of this waste caustic is 16–18% sodium hydroxide and about 2% hemicellulose. For the steeping operation, this solution cannot contain more than 1.25% hemicellulose.

The waste caustic is fed from tank 21 to chamber 22 after being heated to a temperature of 50° C. by the steam supplied through valve 17. By opening valves 1, 2, 3, 4, 5 and 6, while valves 7, 8 and 9 and 10 are kept closed, the solution is passed upwardly through the activated carbon bed in chamber 22. The flow of caustic is measured with a flowmeter 31. The carbon adsorbs hemicellulose from the caustic solution to reduce the hemicellulose concentration in the purified caustic solution to about 0.6% or lower. The solution is then fed from the top of chamber 22 to a caustic collecting tank 23 for re-use in the steeping operation. After approximately 8 hours of passing caustic solution through chamber 22 at a rate of 0.1 gallon per minute, valves 1, 2, 5 and 6 are shut to take tanks 21 and 23 off-stream.

After the caustic solution is drained from the carbon bed a substantial quantity of the solution is still retained by the carbon. To realize maximum sodium hydroxide recovery, the remaining caustic solution is washed from the carbon bed and added to the caustic collected in tank 23 for re-use in the steeping operation. The water for washing is admitted at valve 11 and heated to 90° C. in water heater 24 by steam which is admitted at 18 and leaves at 33. This water is passed upwardly through the column by opening valves 12, 13, 9, 3, 4, 5 and 6. This water is passed through the column for 2 hours at a rate of 0.75–1.3 gallons per minute. The flow of water is measured by flowmeter 32. No significant loss of sodium hydroxide is encountered so that substantially all the sodium hydroxide charged to chamber 22 appears in the purified solution.

At this stage of operation, the caustic solution has been recovered in tank 23 and the carbon in column 22 has adsorbed the hemicellulose. The destruction of hemicellulose to reactivate the carbon is then ready to begin.

Valves 28, 15, 27, 14, 9, 3, 4 and 8 are opened. The others are shut. Air at a rate of 100–125 cubic feet per minute, heated in heater 25 to a temperature of about 140°–150° C., is passed through column 22. The flow of air is measured with an orifice meter 30 in combination with two pressure gauges 35 and 36. In my operation the air is heated in an electrically heated pipe heater, but any heating equipment can be selected. The air is forced to flow upwardly through chamber 22 where it first dries the carbon bed. Simultaneously, steam at a pressure of 30 p. s. i. g. and a temperature of 133° C. is admitted through valve 16 and leaves at 34 to supply additional heat. After 5–6 hours the carbon bed is substantially dry.

The air supply is cut, and in its place a steam-air mixture containing 98.8 mol percent steam and 1.2 mol percent air is passed through the heater 25 where the temperature of the mixture rises to 200°–230° C. The steam is admitted by opening valves 19 and 37 and its flow is measured by orifice meter 29 in combination with pressure gauges 38 and 39. Upon passing through column 22 the mixture starts to oxidize the hemicellulose from the carbon, accompanied by the liberation of heat. The combustion products and the excess heat of combustion are carried off in the gas stream. A control is provided at 20 which acts to eliminate air from the steam-air mixture when the temperature in the column exceeds 250° C. This control will permit steam only to continue through the column until the temperature is reduced to about 220° C. where the control again admits air. As the reactivation cycle progresses and less hemicellulose remains, the portion of air in the mixture is gradually increased. After a period of 8–12 hours, the combustion of the hemicellulose has decreased sufficiently so that the combustion-inhibiting effect of the steam is no longer needed. Pure air, heated in heater 25 to 200°–230° C., is then fed to the column at a rate of 50–75 cubic feet per minute. This is continued for 6–8 hours to complete the combustion of the remaining hemicellulose.

Recognizing the difficulty of maintaining precise times and temperatures during the process, ranges of time and temperature have been specified. However, the necessity of remaining within these prescribed ranges of time and temperature cannot be overstressed. The combustion of hemicellulose, being highly exothermic, must be controlled in accordance with the above specification. Deviation from the prescribed cycle may yield an excessive rate of combustion of hemicellulose with resulting severe damage to the equipment and excessive loss of activated carbon.

The size of the carbon bed is not critical but will depend on the rate of hemicellulose throughput. Thus, for higher caustic flows or higher initial hemicellulose concentration, the bed will be correspondingly greater.

The invention is particularly suited to recover the waste alkali used for steeping in the viscose process. The economies afforded by the process are readily apparent. The important steps of the process occur in a single chamber. Unexpectedly, it has been discovered that although one of the steps is a combustion step, the process can be conducted successfully at relatively low temperatures. The chamber, therefore, need not be built of special high-temperature resisting material. Repeating the cycle of steps does not reduce the adsorptive power of the activated carbon substantially below 90% of the original adsorptive power. The carbon, therefore, can be re-used over and over again. The caustic alkali is also available for re-use in the viscose process. In short, the process of this invention provides a simple and inexpensive method of overcoming a particularly bothersome problem; namely, separating and destroying hemicellulose in waste alkali liquor.

As many widely different embodiments can be made without departing from the scope of this invention, it is understood that the invention is not limited except as defined in the appended claims.

What is claimed is:

1. In a process for removing organic contaminants from alkali liquor wherein the alkali liquor containing alkali and organic contaminants is passed through a bed of activated carbon until the carbon has adsorbed a substantial amount of the organic contaminants, an improved method for reactivating the carbon which comprises passing water through the bed to remove alkali liquor adhering to the carbon; drying the carbon containing the organic contaminants; contacting the bed with a steam-air mixture to initiate combustion of the organic contaminants; regulating the proportion of air in said steam-air mixture to maintain the temperature of the bed below 250° C.; increasing the percentage of air as combustion of the organic contaminants progresses to maintain the temperature between 200° C. and 250° C.; and contacting the bed with heated air while regulating the admission of air to maintain the temperature of the bed below 250° C. to complete combustion of the organic contaminants and to restore substantially the adsorptive capacity of the carbon.

2. In a process for removing hemicellulose from the caustic liquor used for steeping cellulose wherein the caustic liquor containing caustic alkali and hemicellulose is passed through a bed of activated carbon until the carbon has adsorbed a substantial amount of hemicellulose, an improved method for reactivating the carbon which comprises passing water at about 90° C. through the bed to remove caustic adhering to the carbon; contacting the bed with air at 100° C.–150° C. to dry the carbon; contacting the bed with a steam-air mixture containing about 98.8 mol percent steam and about 1.2 mol percent air at a temperature of 200° C.–230° C. to initiate combustion of hemicellulose; regulating the proportion of air in said steam-air mixture to maintain the temperature of the bed below 250° C.; and contacting the bed with air heated to 200° C.–230° C. while regulating the admission of air to maintain the temperature of the bed below 250° C. to complete combustion of hemicellulose and to restore substantially the adsorptive capacity of the carbon.

3. In a process for removing hemicellulose from the caustic liquor used for steeping cellulose wherein the caustic liquor containing caustic alkali and hemicellulose is passed through a bed of activated carbon until the carbon has adsorbed a substantial amount of hemicellulose, an improved method for reactivating the carbon which comprises passing water at about 90° C. at a rate of 0.75–1.3 gallons per minute for about two hours through the bed to remove caustic adhering to the carbon; contacting the bed with air at 100° C.–150° C. flowing at a rate of 100–125 cubic feet per minute for 5–6 hours to dry the carbon; contacting the bed with a steam-air mixture containing about 98.8 mol percent steam and about 1.2 mol percent air at a temperature of 200° C.–230° C. to initiate combustion of hemicellulose; regulating the proportion of air in said steam-air mixture to maintain the temperature of the bed below 250° C.; and contacting the bed with air heated to 200° C.–230° C. and flowing at a rate of 50–75 cubic feet per minute for 6–8 hours while regulating the admission of air to maintain the temperature of the bed below 250° C. to complete combustion of hemicellulose and to restore substantially the adsorptive capacity of the carbon.

(References on following page)

References Cited in the file of this patent

UNITED STATES PATENTS

| | | |
|---|---|---|
| 1,044,434 | Bloch-Pimental | Nov. 12, 1912 |
| 2,207,566 | Waldeck et al. | July 9, 1940 |
| 2,331,622 | Nixon | Oct. 12, 1943 |
| 2,606,143 | Smith et al. | Aug. 5, 1952 |
| 2,701,786 | Evans | Feb. 8, 1955 |
| 2,709,674 | Bergstrom | May 31, 1955 |

OTHER REFERENCES

Josef Schurz: article in Svensk Papperstidn, 1954, pages 57, 399–404.